(12) United States Patent
Jalali (10) Patent No.: US 7,746,828 B2
(45) Date of Patent: Jun. 29, 2010

(54) POLARIZATION REUSE AND BEAM-FORMING TECHNIQUES FOR AERONAUTICAL BROADBAND SYSTEMS

(75) Inventor: Ahmad Jalali, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 11/739,887

(22) Filed: Apr. 25, 2007

(65) Prior Publication Data

US 2008/0122706 A1 May 29, 2008

Related U.S. Application Data

(60) Provisional application No. 60/795,037, filed on Apr. 25, 2006, provisional application No. 60/851,297, filed on Oct. 13, 2006.

(51) Int. Cl.
*H04Q 7/30* (2006.01)
(52) U.S. Cl. .................. 370/334; 370/331; 370/328; 455/562.1; 342/352
(58) Field of Classification Search ............ 370/334, 370/331, 328; 455/562.1; 342/352
See application file for complete search history.

(56) References Cited

U.S. PATENT DOCUMENTS

2006/0002347 A1* 1/2006 Thompson et al. .......... 370/335

2006/0286945 A1* 12/2006 Reznik et al. ............... 455/101
2007/0202804 A1* 8/2007 Vassallo ..................... 455/13.1
2007/0236386 A1* 10/2007 Harpak et al. ............... 342/352

FOREIGN PATENT DOCUMENTS

| GB | 2310109 | 8/1997 |
| WO | 9728615 | 8/1997 |
| WO | 0105088 | 1/2001 |
| WO | 0156186 | 8/2001 |
| WO | 0158049 | 8/2001 |
| WO | 0178257 | 10/2001 |

OTHER PUBLICATIONS

Written Opinion, PCT/US07/067414, International Searching Authority, European Patent Office, Oct. 17, 2007.
International Preliminary Report on Patentability, PCT/US07/067414, The International Bureau of WIPO, Geneva, Switzerland, Oct. 28, 2008.
International Search Report—PCT/US07/067414, International Search Authority—European Patent Office—Oct. 17, 2007.

* cited by examiner

*Primary Examiner*—Danh C Le
(74) *Attorney, Agent, or Firm*—Jeffrey D. Jacobs (57) ABSTRACT

Aeronautical broadband communication is enhanced by providing an apparatus having a first antenna configured to communicate using a signal orientation corresponding to a first polarization, and a second antenna configured to communicate using a signal orientation corresponding to a second polarization, where the second polarization has at least one characteristic difference from the first polarization. Additional antennas may be used, where multiple antennas share one polarization, and multiple other antennas share a different polarization, and signals from like-polarized antennas are combined for beam-formation.

24 Claims, 9 Drawing Sheets

POLARIZATION REUSE AND
BEAM-FORMING TECHNIQUES FOR
AERONAUTICAL BROADBAND SYSTEMS

CROSS-REFERENCE TO RELATED
APPLICATION

This application claims the benefit of U.S. Provisional Application No. 60/795,037 filed Apr. 25, 2006, and of U.S. Provisional Application No. 60/851,297, filed Oct. 13, 2006. The aforementioned provisional applications' disclosures are incorporated herein by reference in their entirety.

BACKGROUND OF THE INVENTION

1. Field of the Invention

The present invention relates generally to aeronautical broadband systems, and more particularly to methods and apparatuses for polarization reuse and beam-forming for aeronautical broadband systems.

2. Background

Wireless communication systems are widely deployed to provide various types of communication such as voice and data. A typical wireless data system, or network, provides multiple users access to one or more shared resources. A system may use a variety of multiple access techniques such as frequency division multiplexing (FDM), time division multiplexing (TDM), code division multiplexing (CDM), and others. Examples of wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system mat conforms to the TIA/EIA/IS-856 standard (the IS-856 standard).

In general, signal strength is a critical factor in establishing a communication link with good quality of service (QoS). In the case of broadband communications with multiple subscribers, the signal strength provided to subscribers' wireless communication devices (WCDs) by the base station and by the WCDs to the base station is limited. In the further case of aeronautical broadband systems, aeronautical wireless communication devices there is a continuous clear line-of-sight between the wireless communication device and the base station.

New methods and apparatuses are needed to improve coverage area utilization above the ground, and to take advantage of the clear line-of-sight available in aeronautical systems. It would be advantageous to provide cost-effective methods and apparatus for polarization reuse and beam-forming for aeronautical broadband systems.

SUMMARY

According to the present inventive subject matter, aeronautical broadband communication is enhanced by providing an apparatus having a first antenna configured to communicate using a signal orientation corresponding to a first polarization, and a second antenna configured to communicate using a signal orientation corresponding to a second polarization, where the second polarization has at least one characteristic difference from the first polarization.

The first polarization may be substantially orthogonal to the second polarization. A first radiator may be configured to communicate using a signal orientation corresponding to the first polarization, and a second radiator configured to communicate using a signal orientation corresponding to the second, polarization. The radiators may be in one cell site or in adjacent respective cell sites. A processor may receive signals from each of the antennas, calculate a signal quality measurement from each of the antennas; and handoff communication responsibilities from one of the antennas to the other of the antennas when the signal quality measurement of one of the antennas is lower than the signal quality measurement of the other of the antennas. The signal quality measurement may be a signal to interference and noise ratio (SINR), a signal to interference ratio (SIR), or a signal to noise ratio (SNR).

The apparatus may include a third antenna configured to communicate using a signal orientation corresponding to the first polarization, and a fourth antenna configured to communicate using a signal orientation corresponding to the second polarization. A processor is configured to combine the signals received from the first antenna and the third antenna in a proportion based on an algorithm for selecting a signal according to a first signal quality measurement. A processor, which can be either the same processor or a different processor, is configured to combine the signals received from the second antenna and the fourth antenna in a proportion based on an algorithm for selecting a signal according to a second signal quality measurement. At least one of the signal quality measurements may include a Signal to Interference plus Noise Ratio (SINR), a Signal to Interference Ratio (SIR), or a Signal to Noise Ratio (SNR). The algorithm may include one of a Minimum Mean Squared Error (MMSE) algorithm, an Equal Gain Combining (EGC) algorithm, a Maximal Ratio Combining (MRC) algorithm applied to the first and second signal quality measurements.

Some embodiments of the present inventive subject matter enhance aeronautical broadband communication by providing an apparatus having a single antenna capable of in a first configuration, communicating using a signal orientation corresponding to a first polarization, and in a second configuration, communicating using a signal orientation corresponding to a second polarization substantially orthogonal to the first polarization.

Some embodiments of the present inventive subject matter enhance aeronautical broadband communication by establishing a first communication link with a first radiator using a signal orientation corresponding to a first polarization, and establishing a second communication link with a second radiator using a signal orientation corresponding to a second polarization having at least one characteristic difference from the first polarization.

Some embodiments of the present inventive subject matter enhance aeronautical broadband communication with a system having means for establishing a communication link with a first radiator using a signal orientation corresponding to a first polarization, and means for establishing a communication link with a second radiator using a signal orientation corresponding to a second polarization substantially orthogonal to the first polarization.

Some embodiments of the present inventive subject matter enhance aeronautical broadband communication with a machine readable medium having instructions for establishing a communication link with a first radiator using a signal orientation corresponding to a first polarization and instructions for establishing a communication link with a second radiator using a signal orientation corresponding to a second polarization substantially orthogonal to the first polarization.

Some embodiments of the present inventive subject matter enhance aeronautical broadband communication with a processor having circuitry for establishing a communication link with a first radiator using a signal orientation corresponding to a first polarization, and circuitry for establishing a communication link with a second radiator using a signal orientation corresponding to a second polarization substantially orthogonal to the first polarization.

Some embodiments of the present inventive subject matter enhance, aeronautical broadband communication with an apparatus having a first antenna, a second antenna, and a processor configured to combine the signals received from the first antenna and the second antenna in a proportion based on an algorithm for selecting a signal according to a signal quality measurement. The signal quality measurement may include a Signal to Interference plus Noise Ratio (SINR), Signal to Interference Ratio (SIR), or Signal to Noise Ratio (SNR). The apparatus may also include a third antenna, a fourth antenna, and a processor configured to combine the signals received from the third antenna and the fourth antenna in a proportion based on an algorithm for selecting a signal according to a signal quality measurement, where the first antenna and the second antenna are configured to communicate using a signal orientation corresponding to a first polarization, and the third antenna and the fourth antenna are configured to communicate using a signal orientation corresponding to a second polarization orthogonal to the first polarization.

The signal quality measurement may include a first measurement from the first antenna and a second measurement from the second antenna, where the algorithm includes one of a Minimum Mean Squared Error (MMSE) algorithm, an Equal Gain Combining (EGC) algorithm, a Maximal Ratio Combining (MRC) algorithm applied to the first measurement and the second measurement. The algorithm may select a radiator for communication characteristics, and the processor may combine the signals received from the first antenna and the second antenna so as to form a beam toward the radiator.

The apparatus may have a first transmit chain which produces signals at a ratio determined from the algorithm, and a second transmit chain which produces signals at a ratio determined from the algorithm. The first transmit chain may have at least one filter and at least one power amplifier, and the second transmit chain may have at least one filter and at least one power amplifier. The algorithm may select a radiator for communication characteristics, the processor may combine the signals received from the first antenna and the second antenna so as to form a beam toward the radiator, and the processor may further produce signals at the fist transmit chain and the second transmit chain so as to form a beam toward the radiator.

Some embodiments of the present inventive subject matter enhance aeronautical broadband communication with a method having the steps of: performing a signal quality measurement based on signals from a first antenna, performing a second signal quality measurement based on signals from a second antenna, feeding the first signal quality measurement and the second signal quality measurement into an algorithm, and combining the signals received from the first antenna and the second antenna at a ratio determined from the algorithm.

Some embodiments of the present inventive subject matter enhance aeronautical broadband communication with a system having a first means for receiving signals and means for performing a first signal quality measurement based on signals from the first receiving means, a second means for receiving signals and means for performing a second signal quality measurement based on signals from the second receiving means, means for determining a desirable proportion for combining the signals received from the first receiving means and the second receiving means based on the first signal quality measurement and the second signal quality measurement, and means for combining the signals received from the first receiving means and the second receiving means in the proportion.

Some embodiments of the present inventive subject matter enhance aeronautical broadband communication with a machine readable medium having instructions for performing a first signal quality measurement based on signals from a first antenna, instructions for performing a second signal quality measurement based on signals from a second antenna, instructions for feeding the first signal quality measurement and the second signal quality measurement into an algorithm, and instructions for combining signals received from the first antenna and the second antenna at a ratio determined from the algorithm.

Some embodiments of the present inventive subject matter enhance aeronautical broadband communication with a processor having circuitry for performing a first signal quality measurement based on signals from a first antenna, circuitry for performing a second signal quality measurement based on signals from a second antenna, circuitry for feeding the first signal quality measurement and the second signal quality measurement into a combining algorithm, and circuitry for combining the signals received from the first-antenna and the second antenna at a ratio determined from the algorithm.

BRIEF DESCRIPTION OF THE DRAWINGS

The features, nature, and advantages of the present invention will become more apparent from the detailed description set forth below when taken in conjunction with the drawings in which like reference characters identify corresponding items throughout and wherein.

DETAILED DESCRIPTION OF THE INVENTION

The word "exemplary" is used herein to mean "serving as an example, instance, or illustration." Any embodiment described herein as "exemplary" is not necessarily to be construed as preferred or advantageous over other embodiments.

The word "example" is used herein to mean "a non-limiting example." Each example provided herein is an illustration of merely one embodiment; many others may exist, and no provided example should be construed as limiting an otherwise broader category.

Overview

Aeronautical broadband communication is enhanced by providing a first antenna configured to communicate using a signal orientation corresponding to a first polarization, and a second antenna configured to communicate using a signal orientation corresponding to a second polarization having at least one characteristic difference from the first polarization. The first polarization may be substantially orthogonal to the second polarization. Radiators of orthogonal polarization may be placed in the same or adjacent cell sites. A processor may handoff communication responsibilities from one of the antennas to the ether of the antennas. Aeronautical broadband communication is also enhanced by providing a first antenna, a second antenna, an algorithm for selecting a signal according to a signal quality measurement, and a processor configured to combine the signals received from the first antenna and the second antenna in a proportion based on the algorithm. The signal quality measurement may include a Signal to Interference plus Noise Ratio (SINR), Signal to Interference Ratio (SIR), or Signal to Noise Ratio (SNR).

Aeronautical broadband communication may also be enhanced by providing a first and third antenna configured to communicate using a signal orientation corresponding to a first polarization, and a second and fourth antenna configured to communicate using a signal orientation corresponding to a second polarization, with one or more processors which combine the signals from the first and third antennas, and further combine the signals from the second and fourth antennas, using an algorithm for selecting a signal according to a signal quality measurement, thereby improving signal quality for each polarization. A processor may handoff communication responsibilities from the first and third antennas to the second and fourth antennas.

Polarization Reuse

Figure 1A:
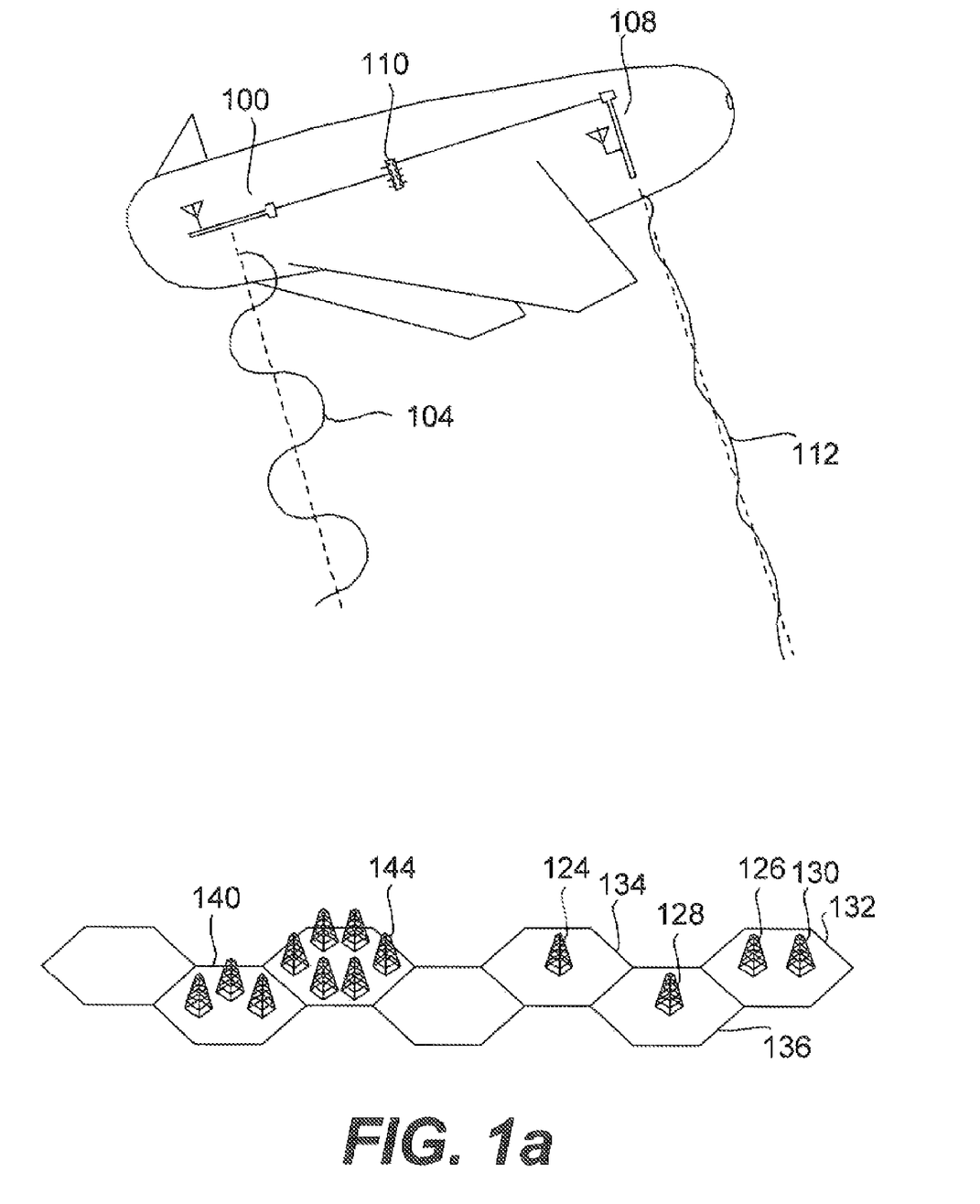
FIG. 1a is a diagram illustrating an example of an aeronautical broadband communication apparatus.

Referring to FIG. 1a, an airborne RF communication transceiver is disposed at an aircraft as part of an aeronautical broadband system. In this system, a cellular network of base stations is deployed with antennas that are designed to provide coverage for aircrafts at high altitudes. In an aeronautical application, a clear line of sight is almost always available from an aircraft from a base station, retaining the polarization of any signal transmitted between them. These base stations may relay a composite signal to a modem disposed at the aircraft, which in turn can communicate with WCDs disposed throughout the aircraft. Alternately, or in the event of an emergency, the base stations may relay a polarized signal directly to an individual WCD such as a personal telephone.

Although shown on a traditional aircraft, the apparatuses, systems, and methods disclosed herein are equally applicable to all air vehicles, space vehicles, oceanic vehicles, and land vehicles. It will be immediately recognized that the apparatus, systems, and methods disclosed herein are useful whenever conditions allow for a polarized beam to substantially retain its polarization over a transmission distance.

Still referring to FIG. 1a, a first antenna 100 is disposed at an aircraft and configured to communicate using signal 104 having an orientation corresponding to a first polarization. As is known in the art, an antenna may be placed at various locations on an aircraft. Different locations provide certain advantages, and the choice in location may be limited by the length of the antenna, proximity to power sources, proximity to sources of interference, and other factors known in the art.

Antenna 100 location and orientation contributes to the polarization of signal 104. In addition, reflection off the exterior surface of the aircraft can change the polarization of waves transmitted or received at the antenna and hence change the signal orientation. As a result, choice of a first polarization will also influence the choice of a location for the antenna. It is noted that the location of antenna 100 on the aircraft as shown in FIG. 1a is an example; therefore, an antenna may be located in any place on the aircraft that meets the desirable conditions discussed above.

Also disposed at the aircraft is a second antenna 108 configured to communicate using signal 112 having an orientation corresponding to a second polarization. Second antenna 108 is therefore configured in a similar manner to antenna 100.

Antennas 100, 108 may, individually or collectively, be connected to amplifiers, passive or active signal boosters, or radio equipment such as receivers. As an example, antennas 100, 108 may be connected to a processor 110 for establishing communication links using die antennas. Processor 110 may be a monolithic processor or a chipset, containing instructions for establishing a communication link with a terrestrial or aeronautical transceiver. The processor 110 may contain programming for commanding the antennas 100, 108 to (for example) activate, deactivate, or change polarization. The processor may also contain commands for encoding and decoding data, multiplexing and demultiplexing signals, storing and routing packets of information, and/or establishing and maintaining communication links with another entity.

The polarization of first signal 104 has at least one characteristic difference from the polarization of second signal 112. As an example, the first polarization may be substantially orthogonal to the second polarization. The first polarization may be substantially horizontal while the second polarization may be substantially vertical. Alternately, the first polarization may be substantially right-circular and the second polarization may be substantially left-circular.

If the first and second polarizations are orthogonal to each other, first antenna 100, being configured to communicate using signal 104, would ideally intercept none of signal 112 with which second antenna 108 communicates. Similarly, second antenna 108 would ideally intercept none of signal 104. However, it is acknowledged that the polarization of signal 104 might change upon reflection at a surface (such as a building face, a ground interferer such as a mountain or lake, or even an external surface of the aircraft). Accordingly, one may use a processor, such as that used for the beam-forming techniques discussed below, to isolate transmissions of a particular polarization.

Again, the location of antenna 108 on the aircraft as shown in FIG. 1a is exemplary; an antenna may be located in any place on the aircraft that meets the desirable conditions discussed above, and may be located adjacent to the first antenna. The location of second antenna 108 on the aircraft may depend on the location chosen for first antenna 100.

The effective doubling in bandwidth provided by the use of two antennas of differing polarization can be used to enhance reception, reduce dead spots, and increase the signal carrying capacity of the network. As an example, a first radiator 124 may be disposed in a first cell site 134, and configured to communicate using signals 104 of the first polarization. A second radiator 128 may be disposed in an adjacent cell site 136, and configured to communicate using signals 112 of the second polarization. In this way, transmissions from first cell site 134 and second cell site 136 are far less likely to interfere with each other, effectively doubling the capacity of the communication system utilizing the antennas 100, 108, and their associated radiators 124, 128. It can be appreciated that such a design still need have only one radiator in each cell site, and thus is no more expensive than a traditional (polarization-independent) cellular configuration.

As a further example, a third radiator 126 and fourth radiator 130 may be disposed in one cell site 132. Each cell site in FIG. 1*a* may be sectorized, and the polarization used in adjacent sectors different, so as to reduce interference at the boundary between two sectors to enhance data rates and increase capacity. As an example, each adjacent cell site could also have two radiators, configured to communicate using signals 104, 112 of two substantially orthogonal polarizations. While this configuration could nearly double the amount of equipment utilized at each cell site, the effective increase in network capacity could provide the same advantages listed above, namely, to enhance reception, decrease dead spots, or increase the signal carrying capacity of the network. Signals 104, 112 could carry the same signal (allowing for advanced error correction and signal strength), or could carry different signals (increasing capacity).

As a further example, not all cell sites need to have two radiators. As shown in FIG. 1*a* as examples, a cell site 140 may have three radiators (one in each sector), or a cell site 144 may have six radiators (two in each sector). One could place a second radiator in sites where it is advantageous: as examples, where interference is expected to be great, where higher capacity is needed, or where conditions are otherwise reliably poor for broadband communication.

Processor 110 may receive signals from each of antennas 100, 108; calculate a signal qualify measurement from each of antennas 100, 108; and handoff communication responsibilities from one of the antennas to the other of the antennas when the signal quality measurement of one of the antennas is lower than the signal quality measurement of the other of the antennas. Such a handoff takes place when a wireless communication device or base station determines that signal quality is, or is expected to be, better on one polarization than on the other. The initiator, either the device or the base station, sends instructions to the other that a switch is to take place, and receives a signal that the instructions have been received and are confirmed. At this time, the two devices begin broadcasting on the new polarization, and confirm each other's presence on the new polarization. Alternately, a single device such as the processor 110 may perform a handoff from one base station (having a first polarization) to a second base station (having a second polarization). The processor 110 sends a command to the first antenna 100 to instruct the base station of the same polarization 124 that a handoff will occur. The base station 124 is optionally networked to base station 128, and may alert base station 128 to expect signals from the processor 110. The processor 110 via antenna 108 then initiates communication on the second polarization. During the handoff the processor 110 may transmit on both polarizations until the base station 128 has detected the signal 112 sent with the second polarization type, at which time the processor 110 stops transmitting to the base station 124 with signal 104 sent with the first polarization type. This is only one type of handoff—many others handoff methods are known to those skilled in the art and are applicable to the present inventive subject matter.

The signal quality measurement by which a decision to hand off is made may be (as examples) a signal to interference ratio (SIR), a signal to noise ratio (SNR), a signal to interference and noise ratio (SINR), or any other signal quality calculation. Such a processor 110 would normally be disposed at the aircraft, and may be a part of the aircraft modem as described above. It is also possible to use a processor disposed at an end-user's telephone, which could perform the same responsibilities if needed. This handoff process could assure that the polarization providing the strongest signal is being utilized when both radiators are disposed in the same cellular site, or could be responsible for switching from one cell site having a first polarization to a second cell site having a different polarization. As a further example, a processor could be disposed on the ground and communicate with radiators 124, 128 rather than with antennas 100, 108. The processor could use the relative signal strength and/or signal quality calculation to determine the ideal communication polarization, and instruct an additional processor at the aircraft to use one or the other polarization.

Figure 1B:
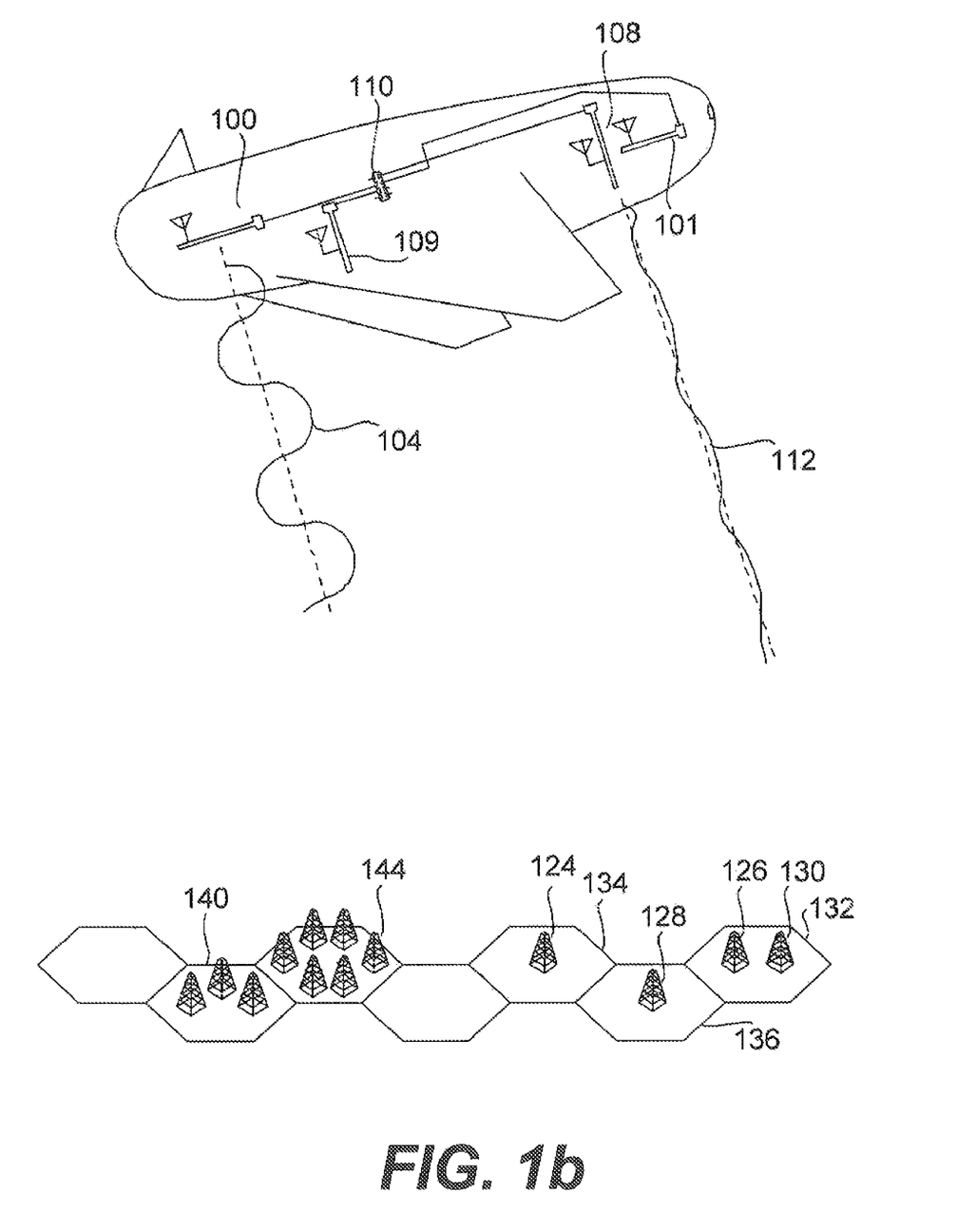
FIG. 1b is a diagram illustrating another example of an aeronautical broadband communication apparatus.

Referring to FIG. 1*b*, in some further embodiments, the aircraft may be provided with two additional antennas. Antenna 101 is configured to communicate using signals 104 of the same first polarization used by antenna 100 and radiator 124, but is disposed at a different location from antenna 100. Antenna 109 is configured to use signals 112 of the same second polarization used by antenna 108 and radiator 128, but is disposed at a different location from antenna 108. The locations shown are merely examples, and antennas of different polarization need not necessarily be disposed near each other. One or more processors (such as processor 110) may combine the signals from antennas 100 and 101, using an algorithm for selecting a signal according to a signal quality measurement. In this way, the two antennas 100 and 101 are used for beam formation, and become a virtual directional antenna capable of being aimed toward a desired target (such as cell site 134), or away from a desired interferer. This beam formation process will be discussed in more detail below. The same processor 110 or a different processor may combine the signals from antennas 108 and 109 in a similar manner, making a second virtual directional antenna of a different polarization than the first virtual antenna. In these embodiments, communication responsibilities are handed off from antennas 100 and 101 to antennas 108 and 109 when one polarization is determined to be better than another.

Of course, while a total of four antennas are shown disposed on the plane of FIG. 1*b*, communication may be enhanced by the placement of even more antennas. Half of the antennas may have a first polarization (the "first group"), while the remaining half may have a second polarization (the "second group"). The antennas in the first group are connected to a processor which can weight the signals received from each of the first group's antennas according to a signal quality measurement. The antennas in the second group are connected to a processor which can weight the signals received from the second group's antennas, also according to a signal quality measurement. In this way, two virtual directional antennas are formed, with different polarizations. These two virtual antennas are therefore highly tunable due to the greater signal localizability provided by more antennas, and can then be aimed through the beam formation techniques discussed below toward two or more base stations of appropriate polarizations.

Again, a third radiator 126 and fourth radiator 130 may be disposed in one cell site 132. Each cell site in FIG. 1*b* may be sectorized, and the polarization used in adjacent sectors different, so as to reduce interference at the boundary between two sectors to enhance data rates and increase capacity. As an example, each adjacent cell site could also have two radiators, configured to communicate using signals 104, 112 of two substantially orthogonal polarizations. While this configuration could neatly double the amount of equipment utilized at each cell site, the effective increase in network capacity could provide the same advantages listed above, namely, to enhance reception, decrease dead spots, or increase the signal carrying capacity of the network. Signals 104, 112 could carry the same signal (allowing for advanced error correction and signal strength), or could carry different signals (increasing capacity).

Again, not all cell sites need to have two radiators. As shown in FIG. 1b as examples, a cell site 140 may have three radiators (one in each sector), or a cell site 144 may have six radiators (two in each sector). One could place a second radiator in sites where it is advantageous: as examples, where interference is expected to be great, where higher capacity is needed, or where conditions are otherwise reliably poor for broadband communication.

Figure 2:
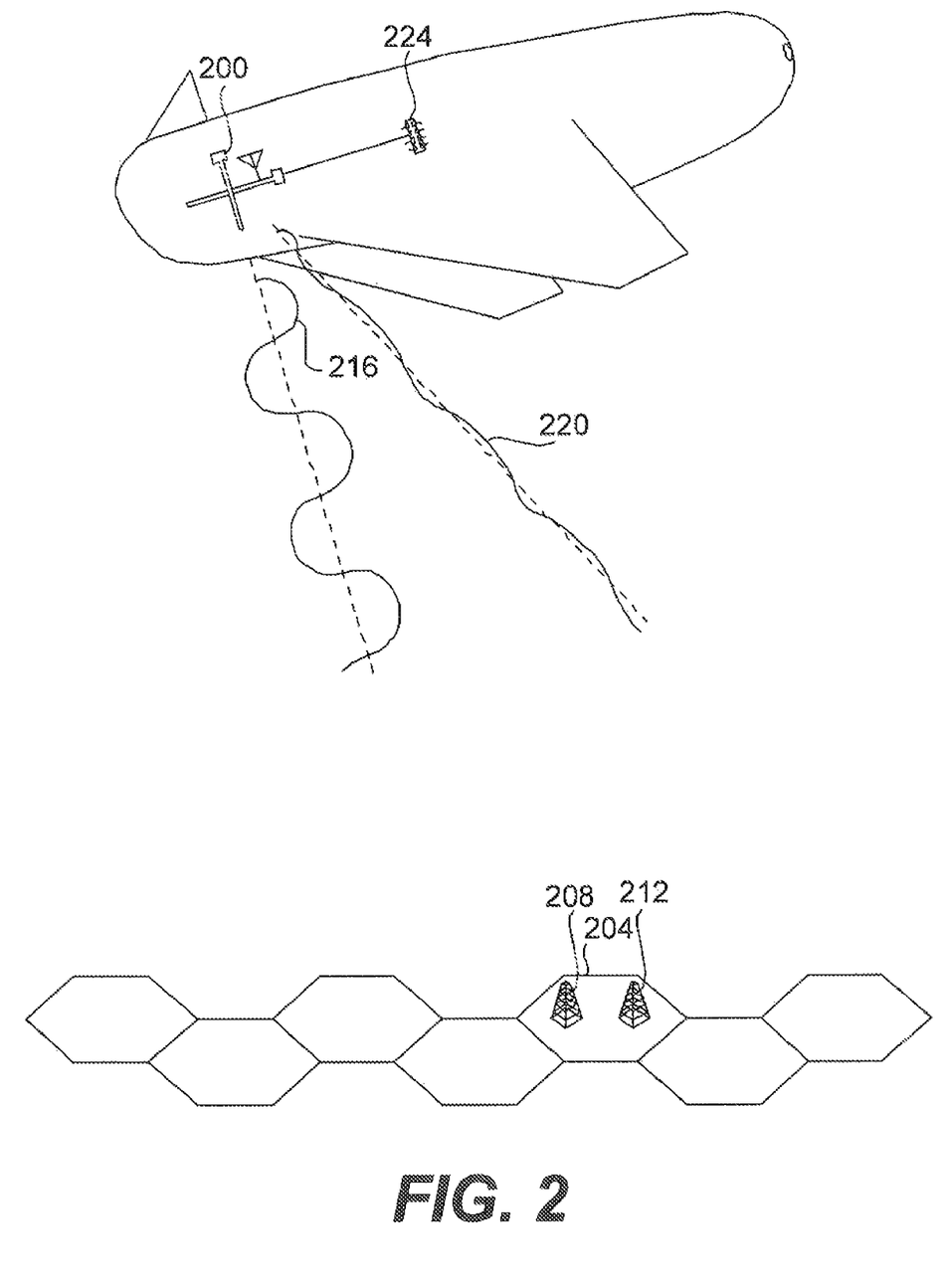
FIG. 2 is a diagram illustrating another example of an aeronautical broadband communication apparatus.

Referring to FIG. 2, in some further embodiments, the aircraft may be provided with a single antenna 200 capable of reconfiguration such that, in a first configuration, it communicates using signals 216 having an orientation corresponding to a first polarization, and in a second configuration, it communicates using signals 220 having an orientation corresponding to a second polarization. The reconfiguration may be achieved through rotation, beam forming, or other mechanical or nonmechanical adjustment. These polarizations may be substantially orthogonal to each other. Shown is a cellular network as described above in which each cell site 204 contains two radiators 208, 212 configured to communicate using signals 216, 220 having orientations corresponding to substantially orthogonal polarizations, or of two polarizations that differ as set forth above. Again, a processor 224 disposed at the aircraft can use the relative signal strength or a signal quality measurement to determine the ideal communication polarization, and then make use of the best polarization by configuring the antenna. Alternately, a processor connected to the two radiators could tune the polarization of the aircraft antenna by remote instructions.

Of course, as a further example as set forth above, alternating cell sites could have radiators of alternating polarization. In this configuration the aircraft reconfigures its antenna to utilize one or the other polarization as it passes from one cell site to the next. As yet another example, each cell-site radiator could also adjust its polarization to improve signal quality, instructing one or more aircraft to adjust their polarizations accordingly.

Figure 3:
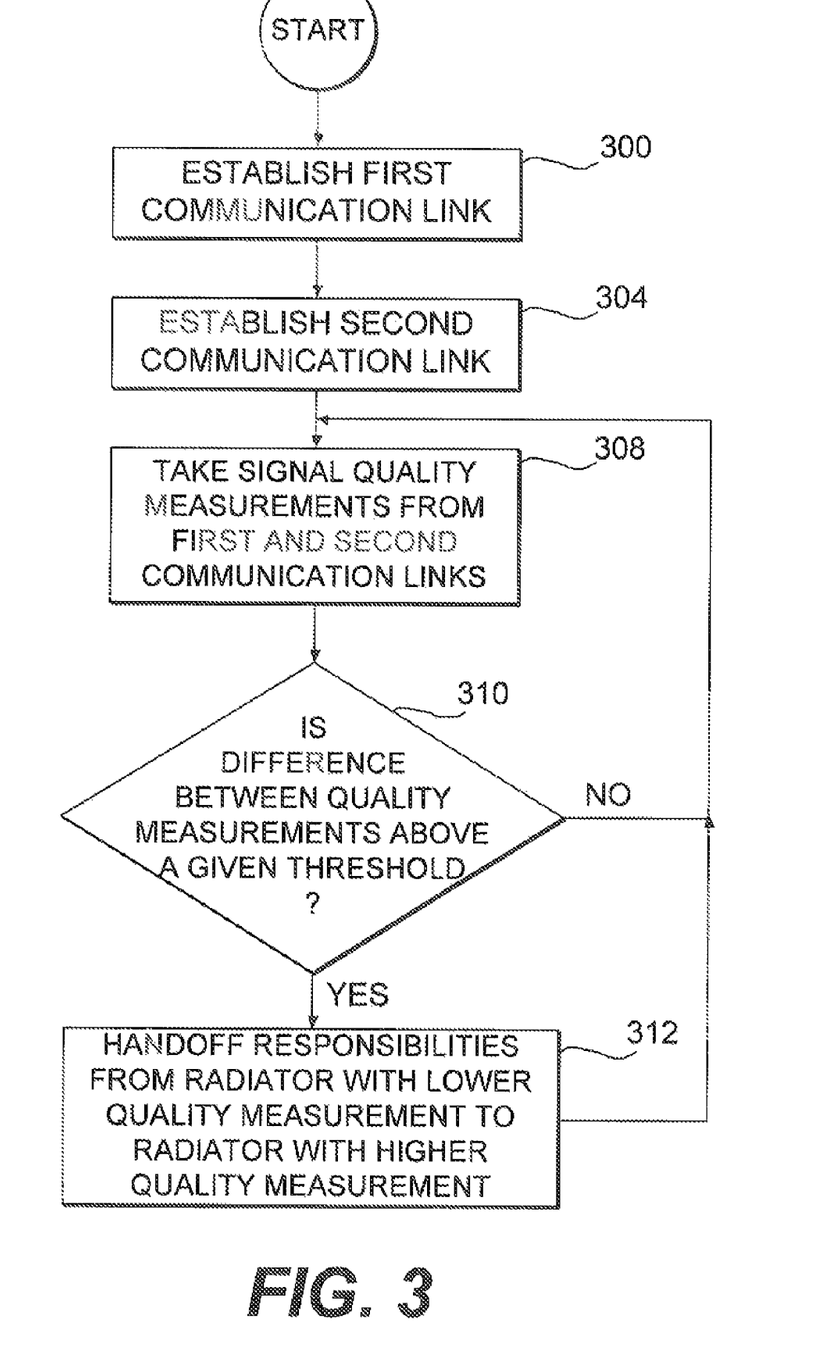
FIG. 3 is a flow diagram showing the functional operation of an aeronautical broadband communication in accordance with the invention.

Charted in FIG. 3 is a method for enhancing aeronautical broadband communication. The method includes: establishing (step 300) a first communication link with a first radiator using a signal orientation corresponding to a first polarization, and establishing (step 304) a second communication link with a second radiator using a signal orientation corresponding to a second polarization having at least one characteristic difference from the first polarization. The radiators may be configured in one or more of the manners set forth above, or in many other manners which will be clear to one skilled in the art upon reading this disclosure. Communication may be established, as an example, by an aircraft having one or more antennas as set forth above. The method can also include taking (step 308) signal quality measurements with respect to the radiators, comparing quality measurements (step 310) to determine if the difference between the measurements is above a given sufficiency threshold, and handing off (step 312) communication responsibilities from one of the radiators to the other of the radiators when the signal quality measurement of one radiator is sufficiently higher than that of another. Of course this handoff can occur whenever one measure is significantly lower than another (where difference below an acceptable threshold is ignored), or whenever one measure is at all lower than another.

Figure 4:
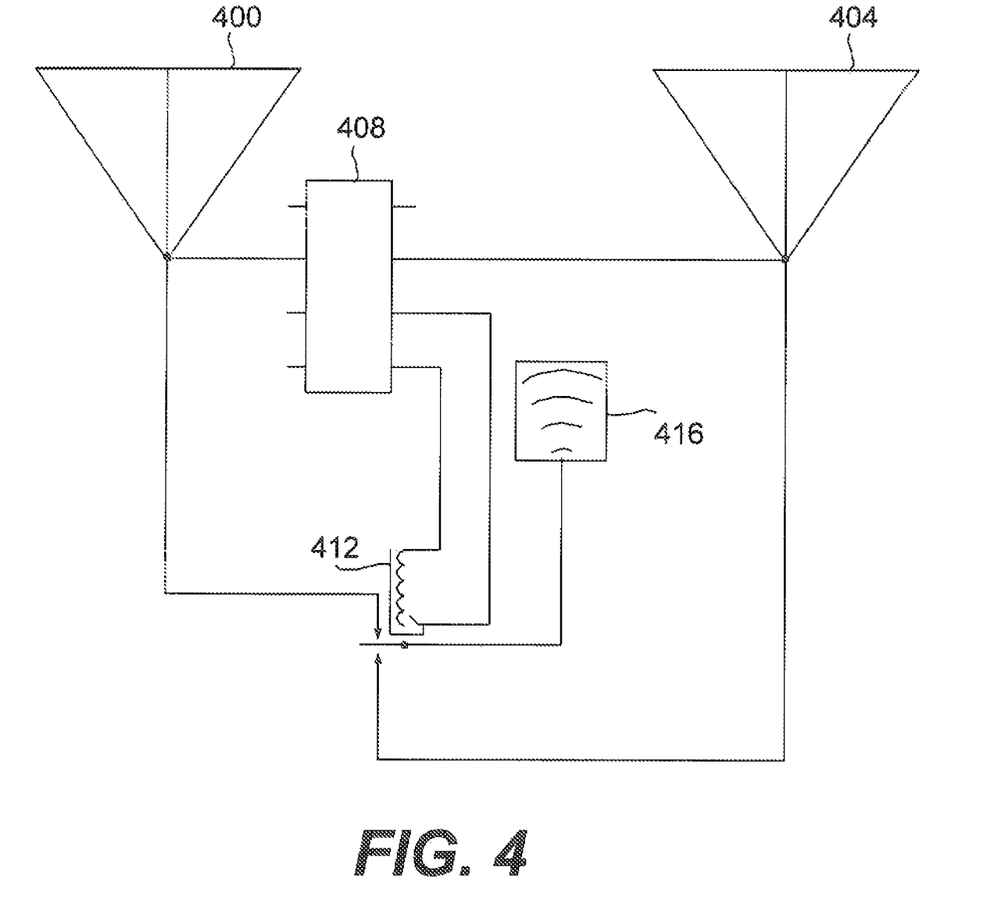
FIG. 4 is a diagram illustrating another example of art aeronautical broadband communication apparatus.

A system may also be provided for enhancing aeronautical broadband communication, as shown in FIG. 4. The system has means 400 for establishing a communication link with a first radiator using a signal orientation corresponding to a first polarization, such as (by way of example) an antenna disposed at an aircraft and configured to communicate using waves of a first polarization establishing a corresponding signal orientation, and a processor connector thereto. The system also has means 404 for establishing a communication link with a second radiator using a signal orientation corresponding to a second polarization substantially orthogonal to the first polarization, such as (by way of example) a second antenna of a different configuration than that of the first antenna at the same aircraft and connected to the same processor. The system can also include means 408 for taking signal quality measurements with respect to each of the radiators, such as (by way of example) a processor containing instructions to perform an SNIR, and means 412 for handing off communication from one radiator to another based on the signal quality measurement, such as (by way of example) a relay which connects a signal source 416 from one antenna or another when the SNIR is greater at one antenna than at another.

A machine readable medium may be provided having instructions for establishing a communication link with a first radiator using a signal orientation corresponding to a first polarization and instructions for establishing a communication link with a second radiator using a signal orientation corresponding to a second polarization substantially orthogonal to the first polarization. A machine-readable medium includes any mechanism that provides (i.e., stores and/or transmits information in a form readable by a machine (e.g., a computer). For example, a machine-readable medium includes, but is not limited to, read only memory (ROM); random access memory (RAM); magnetic disk storage media; optical storage media; flash memory devices; electrical, optical, acoustical or other form of propagated signals (e.g., carrier waves, infrared signals, digital signals, etc.); storage media; radio channels; and wireless channels and various other mediums capable of storing, containing, or earning instructions and/or data.

A processor may be provided having circuitry for establishing a communication link with a first radiator using a signal orientation corresponding to a first polarization, and circuitry for establishing a communication link with a second radiator using a signal orientation corresponding to a second polarization substantially orthogonal to the first polarization. The processor may be a monolithic integrated circuit or a chipset.

Beam Forming

Figure 5:
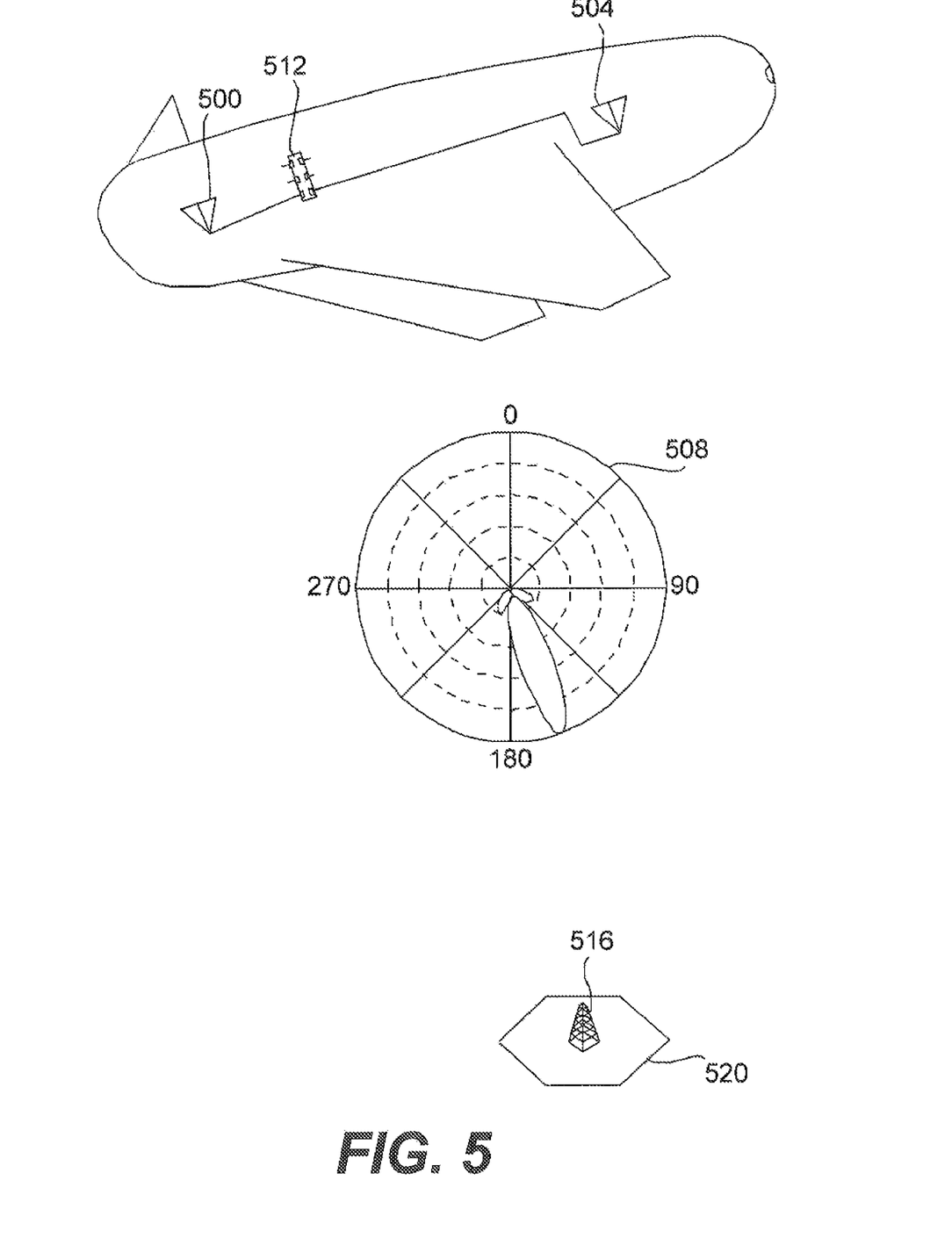
FIG. 5 is a diagram illustrating another example of an aeronautical broadband communication apparatus.

Referring now to FIG. 5, some farther embodiments of the present inventive subject matter enhance aeronautical broadband communication with a beam-forming apparatus having a first antenna 500 and a second antenna 504 disposed at an aircraft or other vehicle, such as those vehicles discussed above. In beam-forming, signals from a discrete set of antennas (which may be directional or non-directional) are combined digitally or electrically to simulate a larger, directional antenna. The antennas may be individually or simultaneously connected to amplifiers, passive or active signal boosters, or radio equipment such as receivers. A processor 512 is configured to combine the signals received from the first antenna and the second antenna in a proportion based on an algorithm for selecting a signal according to a signal quality measurement. The signal quality measurement may include a Signal to Interference plus Noise Ratio (SINR), Signal to Interference Ratio (SIR), Signal to Noise Ratio (SNR), or any of the many signal quality measurements known in the art. The signal quality measurement may include a first measurement from the first antenna and a second measurement from the second antenna, where the algorithm includes a Minimum Mean Squared Error (MMSE) algorithm, an Equal Gain Combining (EGC) algorithm, a Maximal Ratio Combining (MRC) algorithm, or any other convenient combining algorithm applied to the first measurement and the second measurement. The beam may be formed adaptively, and the weighting of the antennas may be adapted on-the-fly.

As an example, if the first antenna 500 has a high signal quality measurement, while the second antenna 504 has a low signal quality measurement, the algorithm will select for the first antenna 500, and the processor 512 will combine the signals, from the antennas 500, 504 in such a way that a greater weight is made to the first antenna 500 than to the second antenna 504. In this manner, a "beam" is formed in a direction outward from the first antenna 500 (shown as field strength diagram 508). When the antennas are used for receiving transmissions, the two antennas thus function as a virtual single directional antenna, pointed in the direction of the first antenna and thus receiving signals from this direction in particular. When the antennas are used for broadcasting, the two antennas again function as a virtual single directional antenna, sending energy in the selected direction. Beam formation may also improve signal quality by nulling signals in other directions.

The algorithm for signal quality measurement may be based on data received at the aircraft or at one or more base stations on the ground. Accordingly, when the antennas are used for receiving signals, a beam may be formed in the direction of the signal of highest quality as measured at the antenna. If the antennas are also (or alternately) to be used for broadcasting, the receiving sites can report a signal quality measurement to the processor, and the processor can use the algorithm to form a transmission beam in the direction of the receiving site which reports the highest quality signal. Thus, the algorithm may select a radiator 516 at a geographic location such as a cell site 520 for communication characteristics, and the processor may combine the signals received from the first antenna and the second antenna so as to form a beam toward the radiator 516.

Although the above example shows how a beam may be formed toward a radiator 516 having a high signal quality measurement (or away from a radiator having a low signal measurement or which is a high source of interference), the presently disclosed inventive subject matter can also be used to direct a beam toward a radiator 516 having a low signal quality measurement as well. In this way, the beam-formed "virtual antenna" can be tuned, toward a weak signal to boost reception or to provide a stronger transmission in that direction.

By adjusting the proportion of signal sent to or received from a plurality of antenna elements, one can form a beam toward a desired base station and put a null toward an interfering base station. One may further form a beam on the transmit side toward a desired base station and reduce interference toward any other base stations thereby increasing the reverse link capacity. The above examples refer to two antennas, however, any number of antennas may be used to resolve a more accurate beam or to improve signal strength.

Figure 6:
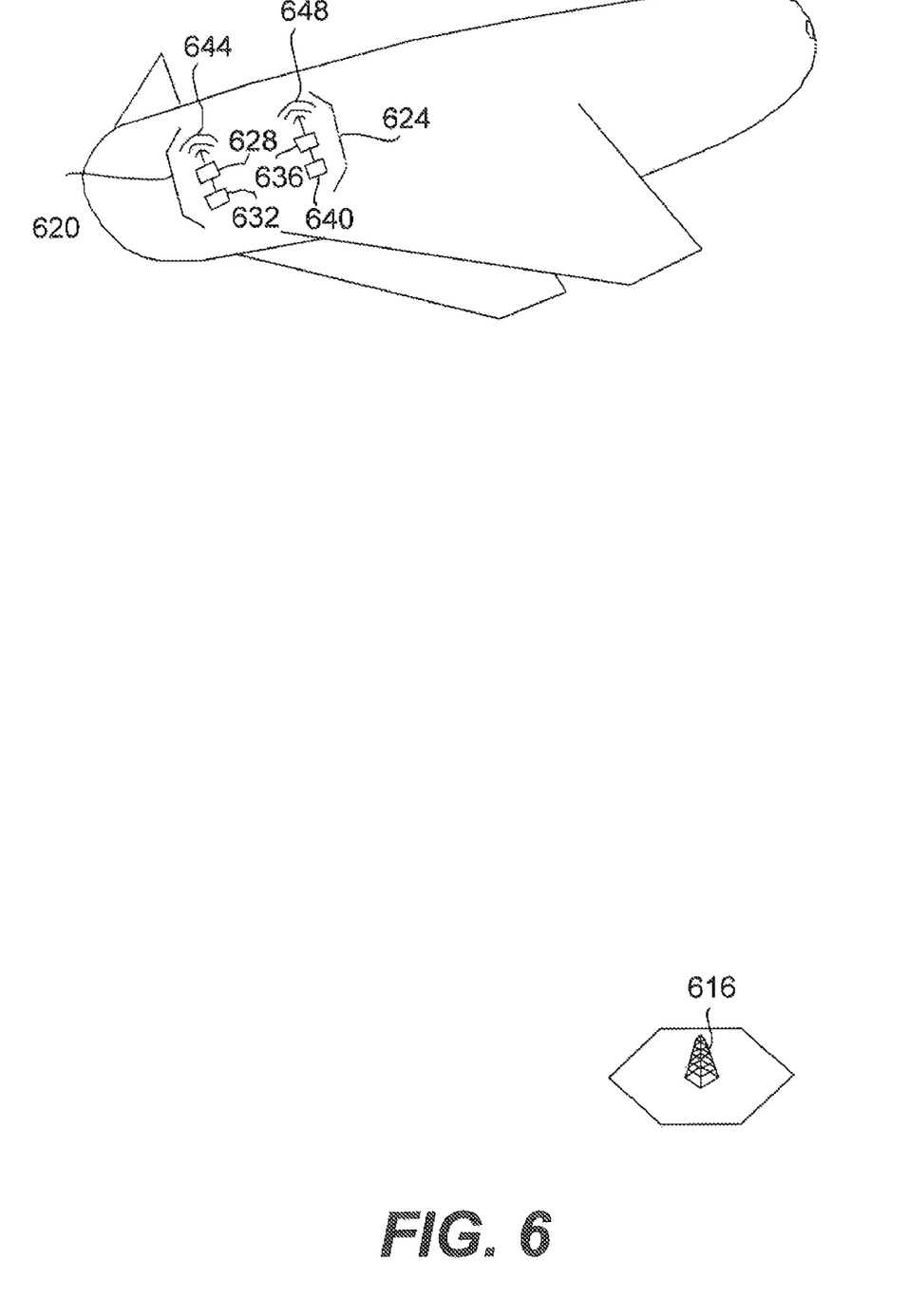
FIG. 6 is a diagram illustrating another example of an aeronautical broadband communication apparatus.

Multiple transmit chains with their own filtering and power amplifies may be used when one wishes to match (a) the coefficient used to weight the signals from each transmit path, with (b) a coefficient which may be chosen to be the same as the one that is used to weigh the signals on the received side. Referring to FIG. 6, the apparatus may have a first transmit chain 620 which produces signals at a ratio determined from the algorithm, and a second transmit chain 624 which produces signals at a ratio determined from the algorithm. The first transmit chain 620 may have at least one filter 628, at least one power amplifier 632, and at least one radiator 644 and the second transmit chain may have at least one filter 636, at least one power amplifier 640, and at least one radiator 648. The chains 620, 624 may of course contain other elements as well. All of the elements of the chains 620, 624 may be connected in any useful order. Thus to allow for beam-formed tuning of both broadcasting and receiving, the algorithm may select a radiator 616 for communication characteristics, a processor (not shown) may combine the signals received from a first antenna and a second antenna (also not shown) so as to form a beam toward the radiator 616, and the processor may further produce signals at the first transmit chain 620 and the second transmit chain 624 so as to form a beam toward the radiator 616.

Figure 7:
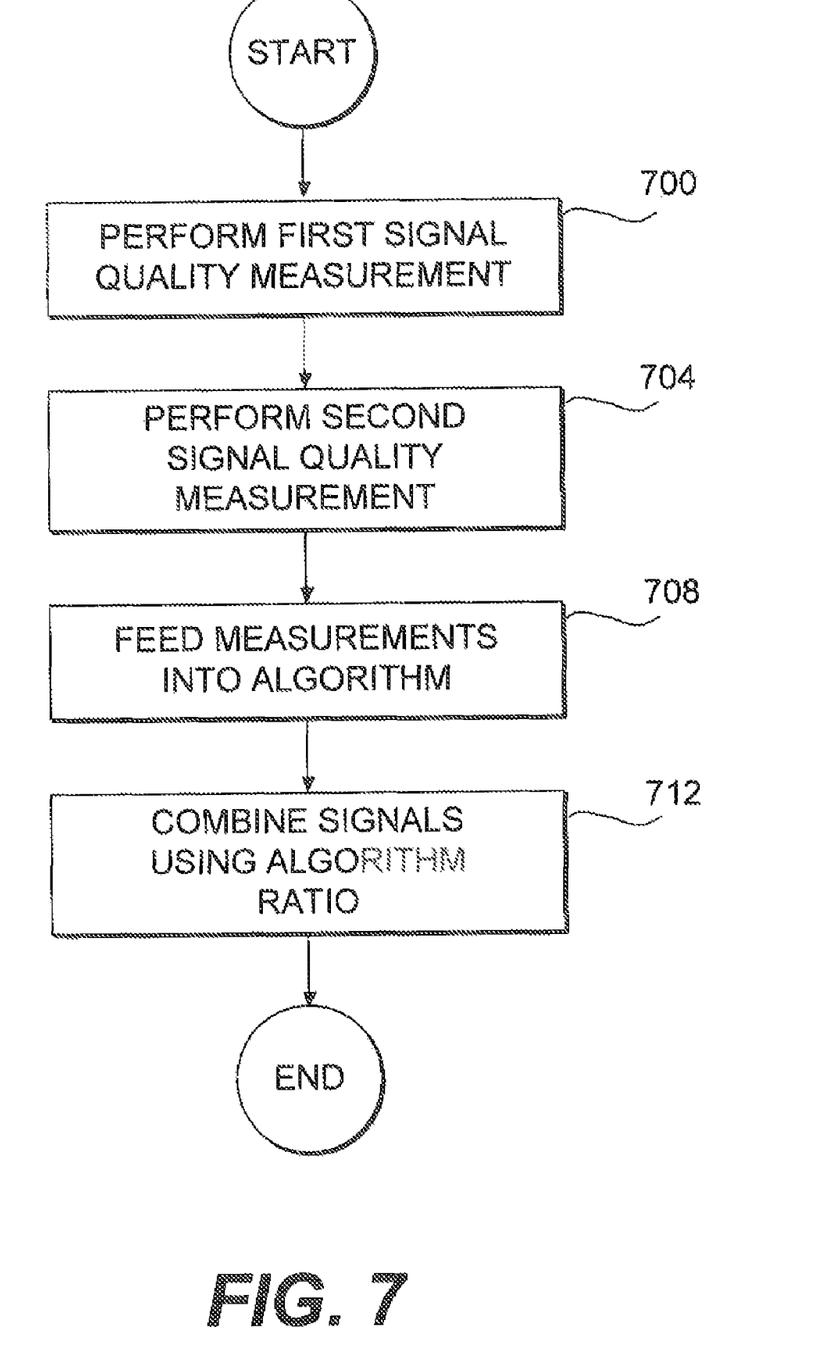
FIG. 7 is a flow diagram showing the functional operation of an aeronautical broadband communication in accordance with the invention.

Referring to FIG. 7, some embodiments of the present inventive subject matter enhance aeronautical broadband communication with a method having the steps of: performing (step 700) a signal quality measurement based on signals from a first antenna, performing (step 704) a second signal quality measurement based on signals from a second antenna, feeding (step 708) the first signal quality measurement and the second signal quality measurement into an algorithm, and combining (step 712) the signals received from the first antenna and the second antenna at a ratio determined from the algorithm.

Figure 8:
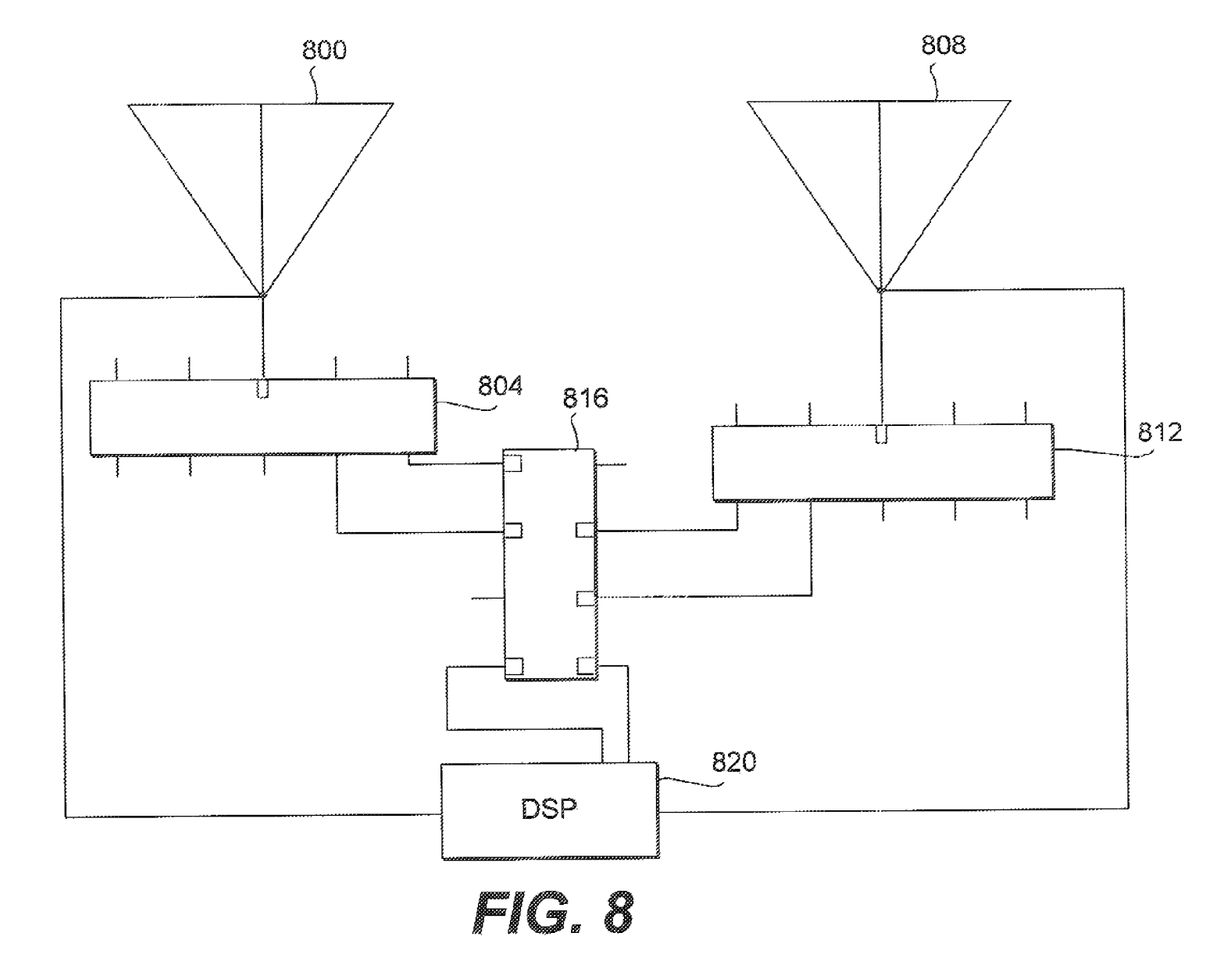
FIG. 8 is a diagram illustrating another example of an aeronautical broadband communication apparatus.

Referring to FIG. 8, some embodiments of the present inventive subject matter enhance aeronautical broadband communication with a system having a first means 800 for receiving signals (by way of an example, an antenna) and means 804 for performing a first signal quality measurement based on signals from the first receiving means 800 (by way of an example, a processor which applies a SNIR measurement on the signal), a second means 808 for receiving signals (by way of an example, another antenna) and means 812 for performing a second signal quality measurement based on signals from the second receiving means 808 (by way of an example, means 812 may be a processor which applies a SNIR measurement on the signal), means 816 for determining a desirable proportion for combining the signals received from the first receiving means 800 and the second receiving means 808 based on the first signal quality measurement and the second signal quality measurement (by way of an example, a processor containing instructions using an algorithm for optimizing output signal quality), and means 820 for combining the signals received from the first receiving means 800 and the second receiving means 808 in the proportion (by way of an example, a digital signal processor connected to the two receiving means).

Some embodiments of the present inventive subject matter enhance aeronautical broadband communication with a machine readable medium having instructions for performing a first signal quality measurement based On signals from a first antenna, instructions for performing a second signal quality measurement based on signals from a second antenna, instructions for feeding the first signal quality measurement and the second signal quality measurement into an algorithm, and instructions for combining signals received from the first antenna and the second antenna at a ratio determined from the algorithm. A machine-readable medium includes any mechanism that provides (i.e., stores and/or transmits information in a form readable by a machine (e.g., a computer). For example, a machine-readable medium includes, but is not limited to, read only memory (ROM); random access memory (RAM);

magnetic disk storage media; optical storage medial; flash memory devices; electrical, optical, acoustical or other form of propagated signals (e.g., carrier waves, infrared signals, digital signals, radio channels; and wireless channels and various other mediums capable of storing, containing, or carrying instructions and/or data.

Some embodiments of the present inventive subject matter enhance aeronautical broadband communication with a processor having circuitry for performing a first signal quality measurement based on signals from a first antenna, circuitry for performing a second signal quality measurement based on signals from a second antenna, circuitry for feeding the first signal quality measurement and the second signal quality measurement into an algorithm, and circuitry for combining the signals received from the first antenna and the second antenna at a ratio determined from the algorithm.

The previous description of some embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Further, one or more of the embodiments can be implemented by hardware, software, firmware, middleware, microcode, or any combination thereof. Thus, the present invention is not intended to be limited to the embodiments shown herein but is to be accorded the widest scope consistent with the principles and novel features disclosed herein.

Having described the invention in detail and by reference to the embodiments thereof, it will be apparent that modifications and variations are possible, including the addition, of elements or the rearrangement or combination or one or more elements, without departing from the scope of the invention which is defined in the appended claims.

The invention claimed is:

1. An apparatus for enhancing aeronautical broadband communication, the apparatus comprising:
   a first antenna configured to communicate using a signal orientation corresponding to a first polarization;
   a second antenna configured to communicate using a signal orientation corresponding to a second polarization, said second polarization having at least one characteristic difference from said first polarization;
   a third antenna configured to communicate using a signal orientation corresponding to said first polarization;
   a fourth antenna configured to communicate using a signal orientation corresponding to said second polarization;
   at least one processor configured to combine the signals received from said first antenna and said third antenna in a proportion based on an algorithm for selecting a signal according to a first signal quality measurement selected from one of a signal to interference plus noise ratio (SINR), a signal to interference ratio (SIR), or a signal to noise ratio (SNR); and
   the at least one processor configured to combine the signals received from said second antenna and said fourth antenna in a proportion based on an algorithm for selecting a signal according to a second signal quality measurement selected from one of a signal to interference plus noise ratio (SINR), a signal to interference ratio (SIR), or a signal to noise ratio (SNR).

2. The apparatus of claim 1, comprising said first polarization provided substantially orthogonal to said second polarization.

3. The apparatus of claim 1, comprising said first polarization provided as horizontal polarization and said second polarization provided as vertical polarization.

4. The apparatus of claim 1, wherein
   said algorithm applied to at least one of said first and second signal quality measurements comprises one of a minimum mean squared error (MMSE) algorithm, an equal gain combining (EGC) algorithm, a maximal ration combining (MRC) algorithm.

5. The apparatus of claim 1, the apparatus further comprising:
   a first radiator configured to communicate using a signal orientation corresponding to said first polarization; and
   a second radiator configured to communicate using a signal orientation corresponding to said second polarization.

6. The apparatus of claim 5, comprising said first radiator and said second radiator provided in one cell site.

7. The apparatus of claim 5, comprising said first radiator and said second radiator provided in adjacent respective cell sites.

8. The apparatus of claim 1, the apparatus further comprising:
   a processor
      able to receive signals from each of said antennas;
      able to calculate a signal quality measurement from each of said antennas; and
      able to handoff communication responsibilities from one of said antennas to the other of said antennas when said signal quality measurement of one of said antennas is lower than said signal quality measurement of the other of said antennas.

9. The apparatus of claim 8, wherein said signal quality measurement comprises one of a signal to interference and noise ratio (SINR), a signal to interference ratio (SIR), or a signal to noise ratio (SNR).

10. A method for enhancing aeronautical broadband communication, the method comprising:
   establishing a first communication link with a first radiator using a signal orientation corresponding to a first polarization;
   establishing a second communication link with a second radiator using a signal orientation corresponding to a second polarization having at least one characteristic difference from said first polarization;
   performing a first signal quality measurement based on signals from a first antenna, said first antenna having a signal orientation corresponding to said first polarization;
   performing a second signal quality measurement based on signals from a second antenna, said second antenna having a signal orientation corresponding to said second polarization;
   performing a third signal quality measurement based on signals from a third antenna, said third antenna having a signal orientation corresponding to said first polarization;
   performing a fourth signal quality measurement based on signals from a fourth antenna, said fourth antenna having a signal orientation corresponding to said second polarization;
   feeding said first signal quality measurement and said third signal quality measurement into a first combining algorithm;
   feeding said second signal quality measurement and said fourth signal quality measurement into a second combining algorithm;

combining the signals received from said first antenna and said third antenna at a ratio determined from said first combining algorithm; and combining the signals received from said second antenna and said fourth antenna at a ratio determined from said second combining algorithm.

11. The method of claim 10, comprising said first polarization provided substantially orthogonal to said second polarization.

12. The method of claim 10, comprising said first polarization provided as horizontal polarization and said second polarization provided as vertical polarization.

13. The method of claim 10, comprising said first and said second radiators provided in a single cell site.

14. The method of claim 10, comprising said first and said second radiators provided in adjacent respective cell sites.

15. The method of claim 10, the method further comprising:

taking signal quality measurements with respect to each of said radiators; and handing off communication responsibilities from one of said radiators to the other of said radiators when said signal quality measurement of one of said radiators is lower than said signal quality measurement of the other of said radiators.

16. The method of claim 15, wherein said signal quality measurement comprises one of a signal to interference and noise ratio (SINR), a signal to interference ratio (SIR), or a signal to noise ratio (SNR).

17. A system for enhancing aeronautical broadband communication, the system comprising:

means for establishing a communication link with a first radiator using a signal orientation corresponding to a first polarization;

means for establishing a communication link with a second radiator using a signal orientation corresponding to a second polarization substantially orthogonal to said first polarization;

means for performing a first signal quality measurement based on signals from a first receiving means, said first receiving means having a signal orientation corresponding to a first polarization;

means for performing a second signal quality measurement based on signals from a second receiving means, said second receiving means having a signal orientation corresponding to a second polarization;

means for performing a third signal quality measurement based on signals from a third receiving means, said third receiving means having a signal orientation corresponding to said first polarization;

means for performing a fourth signal quality measurement based on signals from a fourth receiving means, said fourth receiving means having a signal orientation corresponding to said second polarization;

means for computing a first optimal ratio of signals from said first receiving means and said third receiving means;

means for computing a second optimal ratio of signals from said second receiving means and said fourth receiving means;

means for combining the signals received from said first receiving means and said third receiving means at said first optimal ratio; and means for combining the signals received from said second receiving means and said fourth receiving means at said second optimal ratio.

18. The system of claim 17, the system further comprising:

means for taking signal quality measurements with respect to each of said radiators; and means for handing off communication responsibilities from one of said radiators to the other of said radiators when said signal quality measurement of one of said radiators is lower than said signal quality measurement of the other of said radiators.

19. A tangible computer-readable medium containing instructions for enhancing aeronautical broadband communication, the medium comprising:

instructions for establishing a communication link with a first radiator using a signal orientation corresponding to a first polarization; and instructions for establishing a communication link with a second radiator using a signal orientation corresponding to a second polarization substantially orthogonal to said first polarization;

instructions for performing a first signal quality measurement based on signals from a first antenna, said first antenna having a signal orientation corresponding to said first polarization;

instructions for performing a second signal quality measurement based on signals from a second antenna, said second antenna having a signal orientation corresponding to said second polarization;

instructions for performing a third signal quality measurement based on signals from a third antenna, said third antenna having a signal orientation corresponding to said first polarization;

instructions for performing a fourth signal quality measurement based on signals from a fourth antenna, said fourth antenna having a signal orientation corresponding to said second polarization;

instructions for feeding said first signal quality measurement and said third signal quality measurement into a first combining algorithm;

instructions for feeding said second signal quality measurement and said fourth signal quality measurement into a second combining algorithm;

instructions for combining the signals received from said first antenna and said third antenna at a ratio determined from said first combining algorithm; and instructions for combining the signals received from said second antenna and said fourth antenna at a ratio determined from said second combining algorithm.

20. The medium of claim 19, the medium further comprising:

instructions for taking signal quality measurements with respect to each of said radiators; and instructions for handing off communication responsibilities from one of said radiators to the other of said radiators when one of said radiators has a lower signal quality measurement than the other of said radiators.

21. A processor able to enhance aeronautical broadband communication, the processor comprising:

circuitry for establishing a communication link with a first radiator using a signal orientation corresponding to a first polarization; and circuitry for establishing a communication link with a second radiator using a signal orientation corresponding to a second polarization substantially orthogonal to said first polarization;

circuitry for performing a first signal quality measurement based on signals from a first antenna, said first antenna having a signal orientation corresponding to said first polarization;

circuitry for performing a second signal quality measurement based on signals from a second antenna, said second antenna having a signal orientation corresponding to said second polarization;

circuitry for performing a third signal quality measurement based on signals from a third antenna, said third antenna having a signal orientation corresponding to said first polarization;

circuitry for performing a fourth signal quality measurement based on signals from a fourth antenna, said fourth antenna having a signal orientation corresponding to said second polarization;

circuitry for feeding said first signal quality measurement and said third signal quality measurement into a first combining algorithm;

circuitry for feeding said second signal quality measurement and said fourth signal quality measurement into a second combining algorithm;

circuitry for combining the signals received from said first antenna and said third antenna at a ratio determined from said first combining algorithm; and circuitry for combining the signals received from said second antenna and said fourth antenna at a ratio determined from said second combining algorithm.

22. The processor of claim 21, the processor further comprising:

circuitry for taking signal quality measurements with respect to each of said radiators; and circuitry for handing off communication responsibilities from one of said radiators to the other of said radiators when one of said radiators has a lower signal quality measurement than the other of said radiators.

23. The processor of claim 21, comprising said processor provided as a monolithic integrated circuit.

24. The processor of claim 21, comprising said processor provided as a chipset.

* * * * *